United States Patent [19]

Noguchi et al.

[11] 4,020,817
[45] May 3, 1977

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[22] Filed: Feb. 2, 1976

[21] Appl. No.: 654,221

Related U.S. Application Data

[63] Continuation-in-part of Ser. No. 434,216, Jan. 17, 1975, Pat. No. 3,974,818.

[30] Foreign Application Priority Data

Sept. 1, 1975 Japan .................... 50-106389

[52] U.S. Cl. ................ 123/191 SP; 123/75 B; 123/32 SP
[51] Int. Cl.² ................ F02B 19/10; F02B 19/18
[58] Field of Search .......... 123/75 B, 32 ST, 32 SP, 123/191 S, 191 ST

[56] References Cited

UNITED STATES PATENTS

| | | | |
|---|---|---|---|
| 3,270,721 | 9/1966 | Hideg | 123/32 ST |
| 3,283,751 | 11/1966 | Goossak | 123/32 SP |
| 3,508,530 | 4/1970 | Clawson | 123/32 ST |
| 3,890,942 | 6/1975 | Date | 123/32 SP |

FOREIGN PATENTS OR APPLICATIONS

| | | | |
|---|---|---|---|
| 49-96108 | 11/1974 | Japan | 123/32 SP |
| 49-124405 | 11/1974 | Japan | 123/75 B |

*Primary Examiner*—Ronald B. Cox
*Attorney, Agent, or Firm*—Kenyon & Kenyon

[57] ABSTRACT

An internal combustion engine which includes a main combustion chamber defined by a cylinder, a reciprocating piston in the cylinder and a cylinder head mounted on the cylinder, and a trap chamber having a suction and a discharge aperture is disclosed. The trap chamber is supplied with an air-fuel mixture. The volume of the trap chamber is selected so as to range between 0.03 and 0.13 times the total volume of the main combustion and trap chambers which is defined when the piston is at its top dead center. The size of the suction aperture is selected to be within the range between 0.03 and 0.15 square centimeters per each cubic centimeter of the volume of the trap chamber, and the size of the discharge aperture is selected so as to be within the range between 0.024 and 0.12 square centimeters per each cubic centimeter of the volume of the trap chamber. The ratio of the size of the suction aperture to that of the discharge aperture is preferably selected so as to be within the range between 0.8 and 2.2.

7 Claims, 7 Drawing Figures

INTERNAL COMBUSTION ENGINE

CROSS-REFERENCE TO RELATED APPLICATION

This is a continuation-in-part application of copending U.S. patent application Ser. No. 434,216 filed Jan. 17, 1975, now U.S. Pat. No. 3,974,818.

BACKGROUND OF THE INVENTION

The present invention relates generally to an internal combustion engine, and more particularly to an engine having a main and an auxiliary combustion chamber, as well as an intake valve to control the supply of air-fuel mixture into the main and auxiliary combustion chambers.

For the purpose of reducing the amount of harmful exhaust gas from internal combustion engines, particularly from car engines, there have been proposed diverse types of improvements of the internal combustion engines. One resulting internal combustion engine is of the type in which a main and an auxiliary combustion chamber are disposed in each cylinder so that a stratified combustion of an air-fuel mixture takes place in each cylinder of the internal combustion engine. With the internal combustion engine having main and auxiliary combustion chambers, there have been proposed different types of arrangements for carrying out the supply of the air-fuel mixture into the main and auxiliary combustion chambers. Among these different arrangements, one has been proposed by the present inventors, in which arrangement the air-fuel mixture is introduced into the main and auxiliary combustion chambers through a common intake port and, therefore, a single intake valve provided in the common intake port operates to control the duration of the supply of the air-fuel mixture to both chambers. This type of air-fuel mixture supply arrangement has brought about a practical advantage that the structure and the assembly of an internal combustion engine can be very simple.

The internal combustion engine including the air-fuel mixture supply arrangement of the type described above is characterized in that the auxiliary combustion chamber is formed with a suction aperture through which the auxiliary combustion chamber receives the air-fuel mixture supplied via the intake port during the intake stroke, and a discharge aperture through which residual gas in the auxiliary combustion chamber is discharged or exhausted. Thus, positive exhaustion of the residual gas from the auxiliary combustion chamber as well as filling of a fresh air-fuel mixture into the entire space of the auxiliary combustion chamber are always attained.

The internal combustion engine of the type described above also characterized in that the engine may have such a modified arrangement that the afore-mentioned auxiliary combustion chamber is furnished with an air-fuel mixture richer than that for the main combustion chamber as necessary. The modified arrangement may be realized by providing the internal combustion engine with a separate passageway for enabling the introduction of the richer air-fuel mixture into the auxiliary combustion chamber. In this case, the separate passageway will be arranged so as to also open into the intake port provided for lean air-fuel mixture or air to be introduced into the main combustion chamber. The modified arrangement may also be realized by providing the internal combustion engine with a fuel injection nozzle installed in the intake port.

The internal combustion engines of the type described above are disclosed in, for example, the publicly disclosed Japanese Pat. Nos. 96108/1974, 111008/1975, and 124405/1974. However, it should be noted that in the internal combustion engines of the type described above, the volume of each auxiliary combustion chamber and the areas of the suction and discharge apertures must appropriately be selected so that stabilized combustion of the air-fuel mixture is achieved. Particularly, the sizes or areas of the above-mentioned suction and discharge apertures of the auxiliary combustion chamber must be such that the exhaustion of the residual gases from the auxiliary combustion chamber is promoted during the intake stroke of the engines. This is because the completeness of the exhaustion of the residual gas from the auxiliary combustion chamber has a large influence on the stability of the operation of internal combustion engines. In other words, it should be understood that when the exhaustion from the auxiliary combustion chamber is incomplete, failure of ignition of the rich air-fuel mixture within the auxiliary combustion chamber will often occur with the result that the operation of the internal combustion engine becomes unstable.

SUMMARY OF THE INVENTION

The principal object of the present invention is to eliminate the drawback encountered with the already proposed internal combustion engines with the air-fuel mixture supply arrangement of the type described above.

Another object of the present invention is to provide an internal combustion engine in which stable combustion of a lean air-fuel mixture is achieved thereby efficiently realizing clean exhaust gas from the internal combustion engine.

A further object of the present invention is to provide an internal combustion engine in which the choice of the volume of the above-mentioned auxiliary combustion chamber, and the sizes of the suction and discharge apertures provided for the auxiliary combustion chamber is based on experiments conducted on the operation of an example of an internal combustion engine.

The publicly disclosed Japanese Pat. Nos. 73604/1973 and 78705/1975 disclose a torch ignition type internal combustion engine, in which the volume of the auxiliary combustion chamber and the size of the torch aperture are chosen to be within specified values. However, the choice of the volume of the auxiliary combustion chamber and of the size of the torch aperture in the publicly disclosed torch ignition type internal combustion engine are intended only for enhancement of the so-called torch effect. Thus, the torch ignition type internal combustion engine should be distinguished from the internal combustion engine embodying the present invention.

The foregoing and other objects are effected by the present invention as will be understood from the ensuing description and claims taken in connection with the accompanying drawings, forming a part of this application, in which:

DETAILED DESCRIPTION OF THE PREFERRED EMBODIMENT

Figure 1:
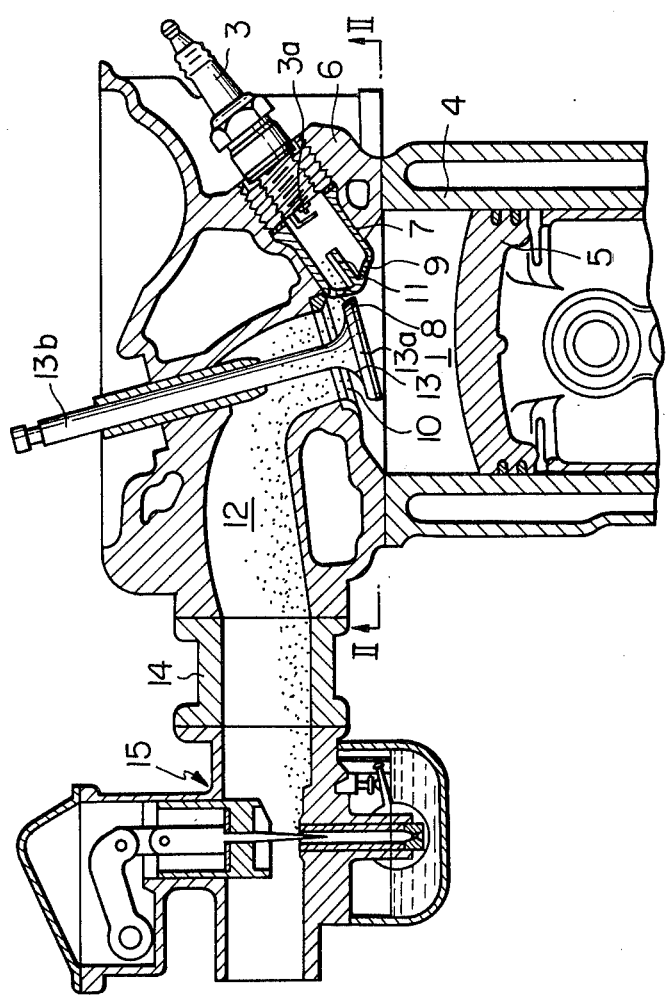
FIG. 1 is a cross-sectional elevation view of an internal combustion engine embodying the present invention.
Figure 2:
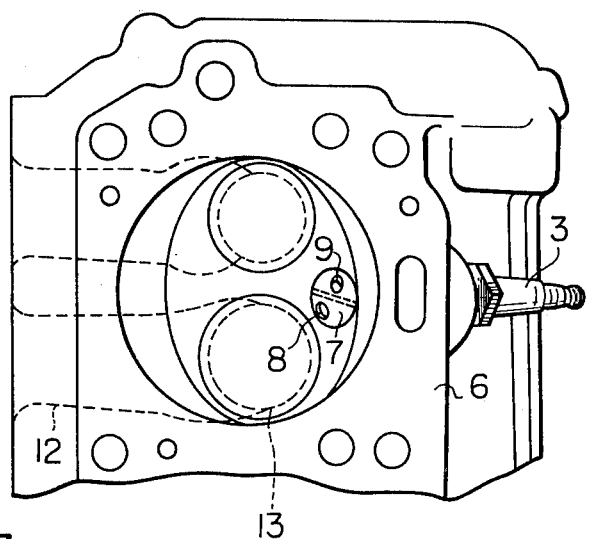
FIG. 2 is a partial cross-sectional view taken along the line II—II of FIG. 1.

Referring to FIGS. 1 and 2 showing an internal combustion engine according to one embodiment of the present invention, the engine is provided with a main combustion chamber 1 and an auxiliary combustion chamber 2 which is usually referred to as "trap chamber". An ignition plug 3 is mounted on the engine so that electrodes 3a of the ignition plug 3 are exposed to the trap chamber 2. The main combustion chamber 1 is defined by a cylinder 4, a piston 5 slidably fitted in the cylinder 4, and a cylinder head 6 located at the top of the cylinder 4. The trap chamber 2 is defined within a hollow cup element 7 which is mounted on the cylinder head 6. The cup element 7 is projected into the main combustion chamber 1 and is provided with a suction aperture 8 and a discharge aperture 9 formed in the projecting part of the cup element 7. The suction aperture 8, which permits an air-fuel mixture supplied during the suction stroke of the piston 5 to pass into the trap chamber 2, opens in the main combustion chamber 1 toward an intake port 10 which opens in the inner surface of the cylinder head 6. The discharge aperture 9 which serves to discharge residual gas from the trap chamber 2, opens in the main combustion chamber 2 toward the top surface of the piston 5. It should be understood that during the combustion stroke of the engine, both suction and discharge apertures 8 and 9 act as torch apertures. In the trap chamber 2, a separating wall 11 is formed as a partition between the apertures 8 and 9. A suction passageway 12, which is formed in the cylinder head 6, is curved downwardly toward the main combustion chamber 2 at its downstream portion. The suction aperture 8 of the trap chamber 2 is located on an inward extension of an outer radial inner surface of the curved portion of the suction passageway. The inner end of the suction passageway 12 is connected to the intake port 10 where an intake valve 13, comprising a valve member 13a and a valve stem 13b, is positioned so as to open and close the intake port 10. The suction passageway 12 allows the supply of an air-fuel mixture into the main combustion chamber 1 and the suction aperture 8 of the trap chamber 2, respectively, through the opened intake port 10 during the suction stroke of the piston 5. It should be appreciated that while the air-fuel mixture flows through the suction passageway 12, the mixture undergoes centrifugal action at the downwardly curved portion of the suction passageway 12. As a result, a rich air-fuel mixture component is urged to the upper part of the flow of the air-fuel mixture within the suction passageway 12. Thus, the rich air-fuel mixture, flowing along the upper part of the inner wall of the downwardly curved portion of the suction passageway 12, is then supplied into the suction aperture 8 of the trap chamber 2. The outer end of the suction passageway 12 is connected to an intake manifold 14 to which a carburetor 15 is connected.

In the engine having the construction as described above, the air-fuel mixture produced by the single carburetor 15 is sucked into the main combustion chamber 1 and the trap chamber 2 of each cylinder 4 through the single suction passageway 12 during the suction stroke of the engine. The duration of the supply of the air-fuel mixture to both chambers 1 and 2 is controlled by the intake valve 13. That is, in response to the opening and closing operation of the single intake valve 13, an intermittent supply of the air-fuel mixture to the main combustion chamber 1 and the trap chamber 2 is carried out. Further, as previously described, the air-fuel mixture is separated into a richer air-fuel mixture component and a leaner air-fuel mixture component under the centrifugal action which the air-fuel mixture undergoes when it flows past the curved suction passageway 12. Thus, the rich air-fuel mixture component is sucked into the trap chamber 2, while the lean air-fuel mixture component is sucked into the main combustion chamber 1. While each mixture component is being sucked into the corresponding chamber, residual gas is discharged from the trap chamber 2 through the discharge aperture 9 owing to the pumping action exerted by the piston 5 moving downwardly in the cylinder 4 during the intake stroke. As a result, a fresh and rich air-fuel mixture sucked through the suction aperture 8, flows into the trap chamber 2. It should be understood that the flow of the rich air-fuel mixture is substantially guided by the separating wall 11 into the region adjacent to the electrodes 3a of the ignition plug 3. Thus the trap chamber 2 is completely scavenged and then filled with the fresh and rich air-fuel mixture with certainty. The air-fuel mixture, which is subsequently compressed by the compression stroke of the piston 5, is ignited by a spark of the ignition plug 3 within the trap chamber 2, whereby torch jets are spurted through both apertures 8 and 9 into the main combustion chamber 1 so that the combustion of the lean air-fuel mixture within said main combustion chamber 1 can be definitely attained. Thus, in each cylinder 4, a stable combustion of the lean air-fuel mixture takes place by virtue of the torch ignition so that clean exhaust emission from the internal combustion engine is achieved.

Figure 3:
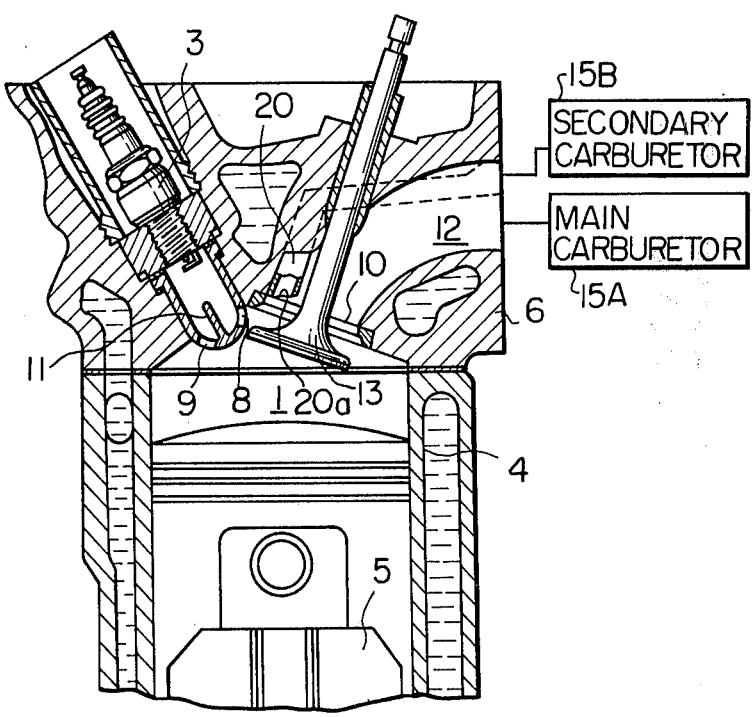
FIG. 3 is a cross sectional elevation view of another internal combustion engine embodying the present invention.

A description of the arrangement of an internal combustion engine according to another embodiment of the present invention will be hereinbelow presented with reference to FIG. 3. It should be noted that in the engine of FIG. 3, like elements or parts as those of the engine of FIGS. 1 and 2 are designated by the same reference numerals. In the engine of FIG. 3, a main carburetor 15A, which is intercommunicated with the suction passageway 12, produces a lean air-fuel mixture to be supplied into the main combustion chamber 1 of each cylinder 4 through the suction passageway 12 and the intake port 10. A secondary carburetor 15B, which is intercommunicated with a secondary passageway 20, produces an air-fuel mixture richer than that produced by the main carburetor 15A, and supplies the rich air-fuel mixture into the passageway 20. The secondary passageway 20, formed in the cylinder head 6 adjacent to the suction passageway 12, has its one end opening 20a located adjacent to the intake port 10. Thus, the rich air-fuel mixture supplied into the secondary passageway 20 is sucked into the trap chamber 2 through the opening 20a, the intake port 10, and the suction aperture 8 when the intake port 10 is opened by the intake valve 13. It will be seen from FIG. 3 that the suction aperture 8 is located adjacent to and faces the opening 20a of the secondary passageway 20 for the rich air-fuel mixture. It will also be understood from FIG. 3 that the discharge aperture 9 opens toward the top surface of the piston 5. It should now be appreciated that the construction of the engine described above ensures the suction of the rich air-fuel mixture into the trap chamber 2. As a result, sure ignition of the lean air-fuel mixture within the main combustion chamber 1, owing to the torch jets spurted from the trap chamber 2 through both apertures 8 and 9, is guaranteed.

Figure 4:
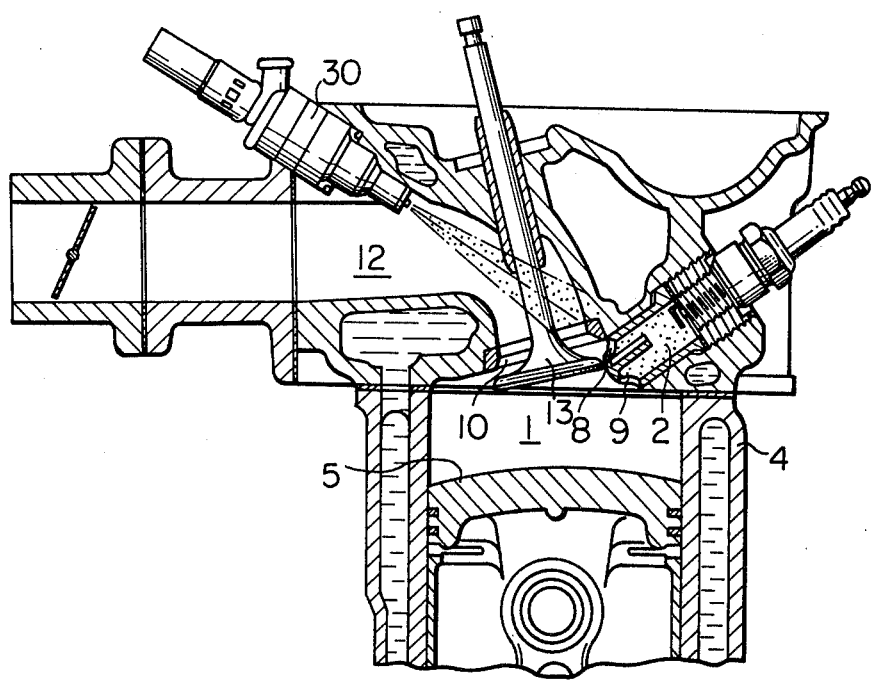
FIG. 4 is a cross sectional elevaton view of a further internal combustion engine embodying the present invention.

A description of the internal combustion engine according to the third embodient of the present invention will now be presented with reference to FIG. 4.

As is seen from FIG. 4, the construction of the engine of the third embodiment is very similar to that of the engine of the first embodiment shown in FIGS. 1 and 2. Thus, like elements or parts are designated by the same reference numerals. However, the important difference from the first embodiment resides in the fact that a fuel injection nozzle 30 is installed in the suction passageway 12 through which air or a lean air-fuel mixture is delivered into the main combustion chamber 1. The fuel injection nozzle 30 injects a rich air-fuel mixture toward the suction aperture 8 of the trap chamber 2 during the suction stroke of the piston 5. The fuel injection nozzle 30 shown in FIG. 4 is of the electro-magnetically operated type by which fuel is intermittently injected. However, a continuously injecting type of the injection nozzle may be employed and will result in the same operation as the above-mentioned intermittently injecting fuel injection nozzle 30.

Figure 5:
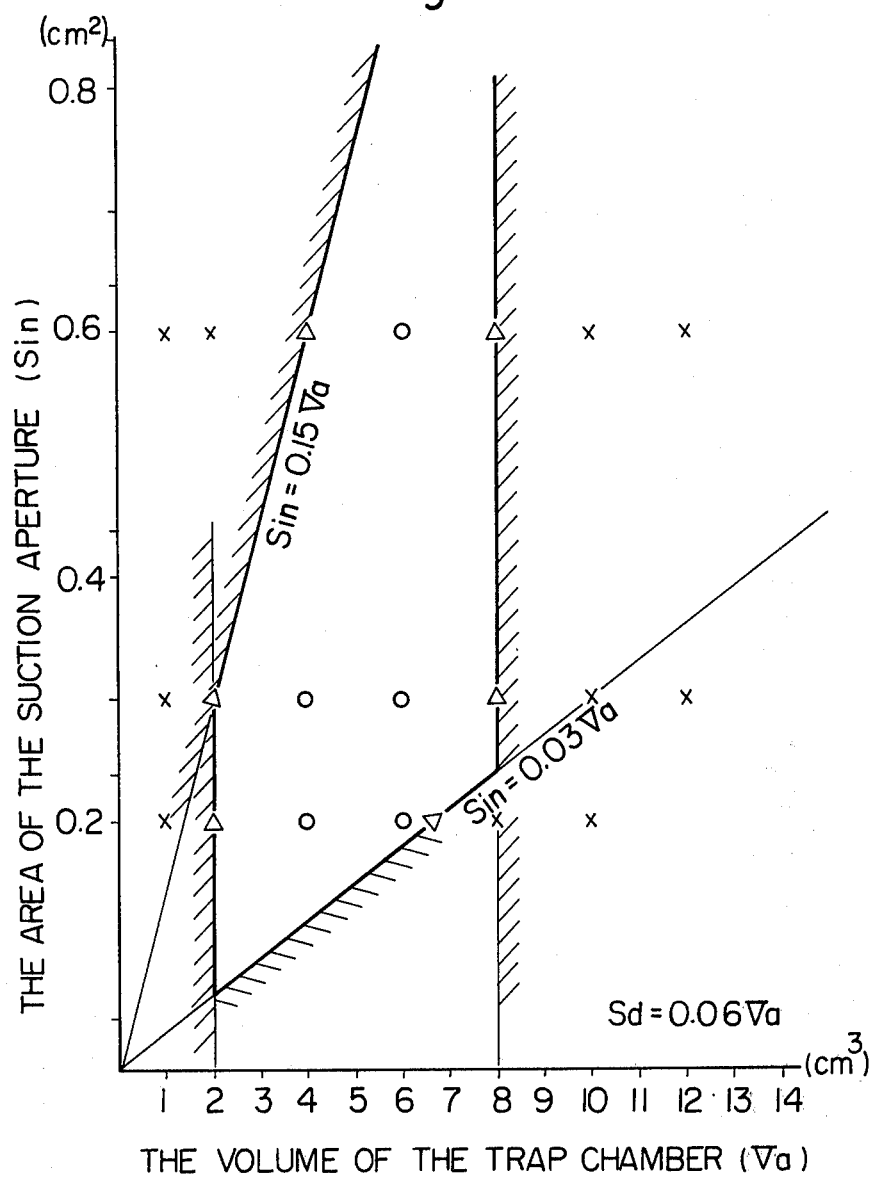
FIGS. 5 through 7 are diagrams illustrating results of experiments with respect to the internal combustion engine of the present invention, respectively.
Figure 6:
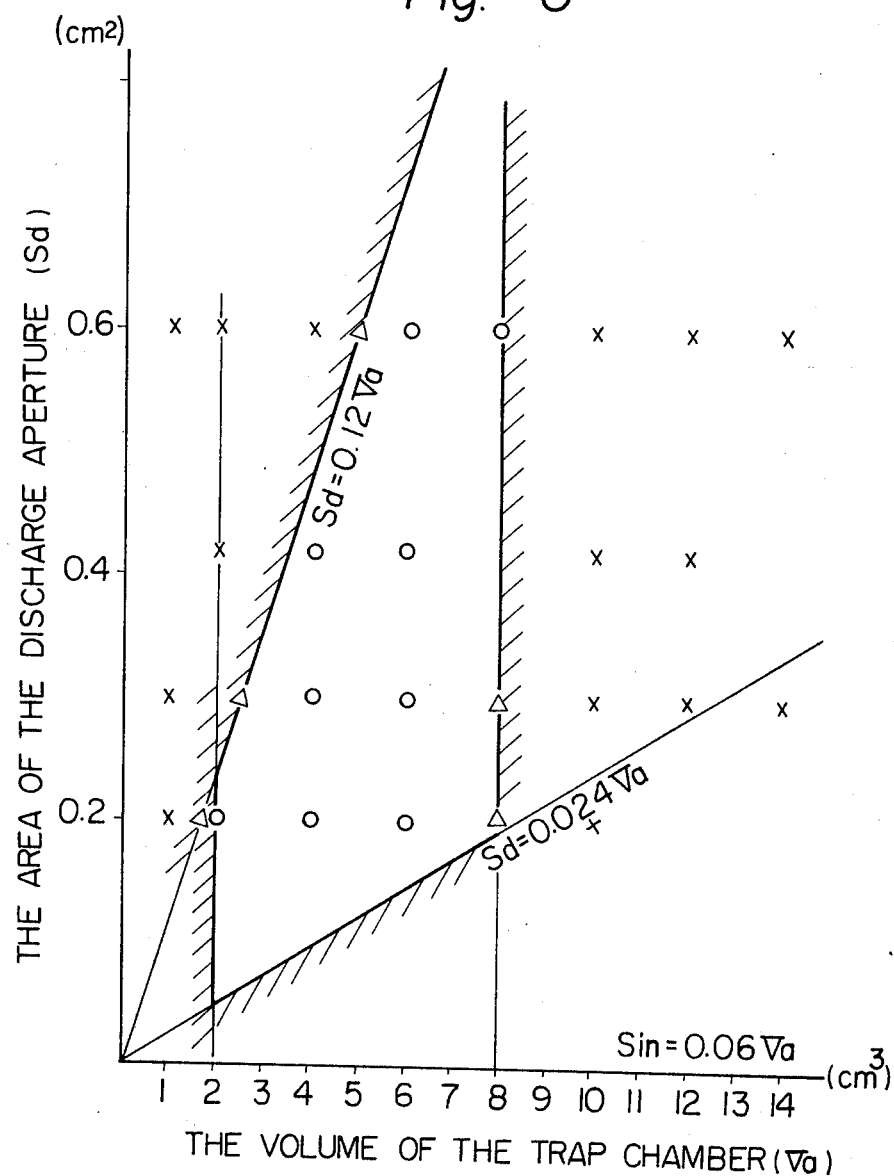
Figure 7:
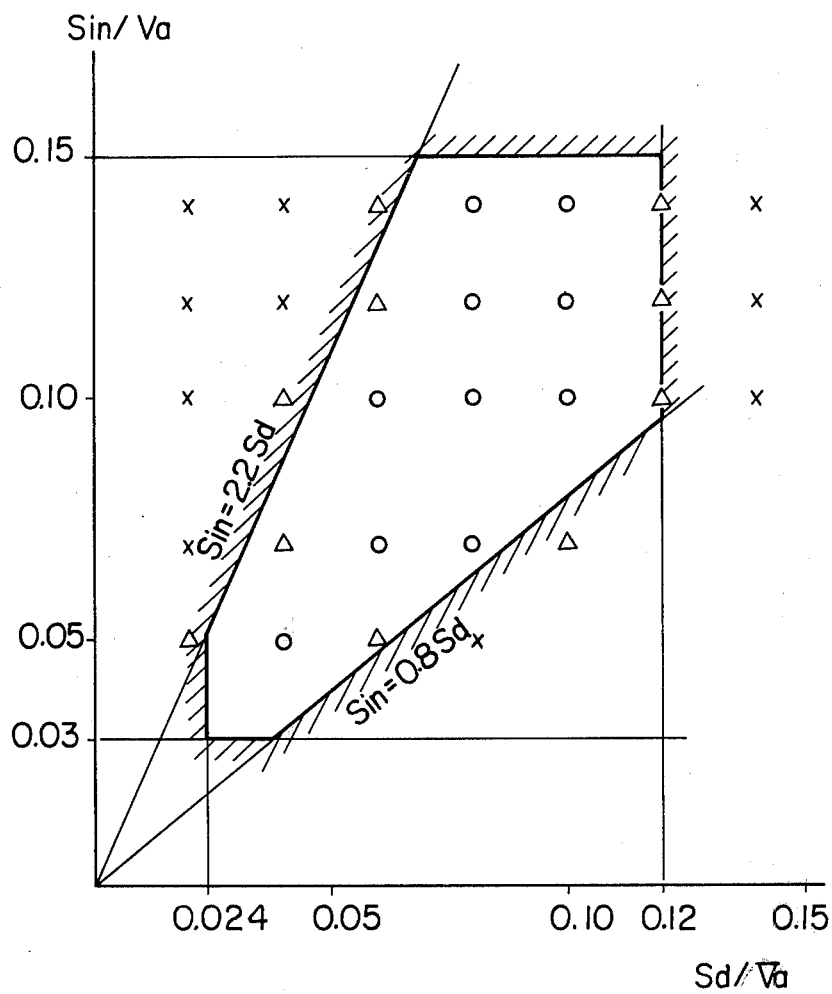

The foregoing descriptions were directed to the three arrangements of the internal combustion engine embodying the present invention. With respect to these arrangements, the volume of the trap chamber is an important factor in causing an optinum combustion within the main combustion chamber 1. Also, the sizes of both suction and discharge apertures 8 and 9 of the trap chamber 2, which produce torch jets from the trap chamber 2 into the main combustion chamber 1, are important factors to acquire a proper torch effect and stable combustion within the main combustion chamber 1. Therefore, determination or choice of the extent of the volume of the trap chamber 2 and of the sizes of the suction and discharge apertures 8 and 9 must be such that an optinum and stable combustion of the air-fuel mixture within the main combustion chamber 1 will take place. Further, it is necessary to take into consideration not only the size of the discharge aperture 9 but also the size of the suction aperture 8 in achieving complete scavenging of the trap chamber 2. In addition, the ratio between the area of the suction aperture 8 and the area of the discharge aperture 9 has a great effect on the completeness of the scavenging of the trap chamber 2. Thus, said ratio must be selected on the basis of experiments so as to be within a properly determined range. The results of the experiments performed are shown in the diagrams of FIGS. 5, 6 and 7.

The example of the internal combustion engine used for performing the experiments was of the type in which the number of cylinders is four and the total piston displacement is 2000 cubic centimeters. Each cylinder was provided with the internal arrangement as shown in FIG. 3. Further, the operating conditions of the engine during the experiments were as follows.

The number of rotations of the engine = 2,000 (r.p.m.)

The degree of the intake vacuum = 240 milimeter Hg

The average air-fuel ratio of the air-fuel ratios of the main combustion and the trap chamber = 18

The quality of the experimental results was ascertained based on the general evaluation of the measured results of: (i) the amount of generation of harmful components contained within the exhaust gas, such as nitrogen oxides, carbon monoxide, and hydrocarbon; (ii) the fuel consumption, and; (iii) the rate of change in combustion which is an analogous factor to the rate of change in torque of the engine and is indicative of the degree of stability of the operation of an internal combustion engine.

In FIGS. 5 through 7, the circle mark "0" indicates that the engine operation is of the best quality where the amount of generation of harmful exhaust components is quite small, the fuel consumption is superior, and the rate of change in combustion is small. The triangle mark "Δ" indicates that the engine operation is of a good and acceptable quality, while the cross mark "X" indicates that the engine operation is of an inferior and unacceptable quality. FIG. 5 indicates the results of the experiments when the relationship between the volume (Va) of the trap chamber 2 and the area (Sin) of the suction aperture 8 of the trap chamber 2 was changed, while the area (Sd) of the discharge aperture 9 and the volume (Va) were maintained at a constant relationship as shown by the equation Sd=0.06·Va. The abscissa of FIG. 5 shows the volume of the trap chamber 2, and the ordinate of FIG. 5 shows the area of the suction aperture 8 as viewed from the direction corresponding to the flowing direction of the air-fuel mixture into the trap chamber 2. FIG. 6 similarly shows the results of the experiments when the relationship between the volume (Va) of the trap chamber 2 and the area (Sd) of the discharge aperture 9 was changed, while the area (Sin) of the suction aperture 8 and the volume of the trap chamber 2 were maintained at a constant relationship indicated by the equation Sin=0.06·Va. Further, FIG. 7 indicates the results of the experiments when the relationship between the area (Sin) of the suction aperture 8 and the area (Sd) of the discharge aperture 9 was changed, while the volume of the trap chamber 2 is maintained at a given extent. In FIG. 7, it should be noted that the scales of the abscissa and the ordinate show the values of Sin/Va and Sd/Va, respectively. From the results shown in FIGS. 5 through 7, it will be understood that the volume (Va) of the trap chamber 2 should preferably be within the range of two cubic centimeter through eight cubic centimeter, the area (Sin) of the suction aperture 8 should preferably be within the range of 0.03 Va through 0.15 Va, and the area (Sd) of the discharge aperture 9 should preferably be within the range of 0.024 Va through 0.12 Va. It will also be understood that the ratio Sin/Sd should be within the range between 0.8 and 2.2, and that the area (Sin) should preferably be slightly larger than the area (Sd). In addition, it is necessary that the relative relationship between the volume of the trap chamber 2 and the volume of the main combustion chamber 1 be taken into consideration. In the actual comparison, the ratios of the above-mentioned various volumes of the trap chamber 2 to the total volume of the main combustion 1 and the trap chambers 2, which is defined when the piston 5 is at its top dead center (TDC), ranged between 0.03 and 0.13. Consequently, it was understood that the ratio of the volume of the trap chamber 2 to the volume of the main combustion chamber 1 should desirably be within the range of 0.03 and 0.13 for every engine embodying the present invention.

It was also confirmed that the results of the above-mentioned experiments are applicable to internal combustion engines of the present invention which have a different internal arrangement from that of the engine used for the above-mentioned experiments.

It should be understood that due to the above-mentioned determination of the volumes of the main combustion and trap chambers and of the sizes of the suction and discharge apertures, cleaning of the exhaust gases from internal combustion engines as well as enhancement of the fuel consumption and stable combustion of the lean air-fuel mixture can be achieved. In some internal combustion engines embodying the present invention, a plural number of suction and discharge apertures may be provided for the trap chamber 2. In this case, the entire area of the plural suction apertures and the entire area of the plural discharge apertures should meet the conditions obtained from the above-explained experiments.

What is claimed is:

1. An internal combustion engine including: a main combustion chamber which is defined by a cylinder, a piston movably fitted in the cylinder, and a cylinder head with an intake port mounted on the cylinder; a trap chamber intercommunicating with the main combustion chamber and having a limited volume of space separated from said main combustion chamber, the trap chamber being provided with at least a suction aperture through which an air-fuel mixture is suplied into the space of said trap chamber, and at least a discharge aperture for discharging residual gas from said trap chamber into said main combustion chamber; an ignition plug having electrodes exposed to said trap chamber, and; an intake valve for closing and opening said intake port through which both said main combustion and said trap chambers are supplied with the air-fuel mixture, wherein said limited volume of space of said trap chamber is selected so as to be within a range between 0.03 and 0.13 times the total volume of said limited volume of said trap chamber and the volume of said main combustion chamber when said piston is at the top dead center; said suction aperture of said trap chamber is provided with an opening area whose size is selected so as to be within a range between 0.03 and 0.15 square centimeters per each cubic centimeter of said volume of said trap chamber, and; said discharge aperture of said trap chamber is provided with an opening area whose size is selected so as to be within a range between 0.024 and 0.12 square centimeters per each cubic centimeter of said volume of said trap chamber.

2. An internal combustion engine as defined in claim 1 wherein the ratio of said opening area of said suction aperture to that of said discharge aperture is selected so as to be within a range between 0.8 and 2.2.

3. An internal combustion engine as defined in claim 1, wherein said engine comprises a carburetor and a suction passageway horizontally extending from the carburetor to the main combustion chamber via the intake port, said suction passageway being provided for allowing the air-fuel mixture to flow from the carburetor to said intake port and having a curved portion thereof formed in said cylinder head at the portion adjacent to said intake port, said suction aperture of said trap chamber being located on an inward extension of an outer radial inner surface of said curved portion, said curved portion guiding a rich air-fuel mixture component of said air-fuel mixture into said trap chamber through said suction aperture.

4. An internal combustion engine as defined in claim 1, wherein said trap chamber is provided with a separating wall formed as a partition between said suction and discharge apertures.

5. An internal combustion engine as defined in claim 1, wherein said engine further comprises a separate suction passageway having an opening located at said intake port, said separate suction passageway being provided for separately introducing a rich air-fuel mixture different from the air-fuel mixture into said trap chamber through said suction aperture when said intake valve opens.

6. An internal combustion engine as defined in claim 1, wherein said engine comprises a suction passageway for introducing air into said main combustion chamber and a fuel injection nozzle installed in said suction passageway.

7. An internal combustion engine as defined in claim 6, wherein said fuel injection nozzle injects a fuel toward said suction aperture of said trap chamber.

* * * * *